(12) United States Patent
Garrick

(10) Patent No.: US 12,431,484 B2
(45) Date of Patent: Sep. 30, 2025

(54) NEGATIVE ELECTRODE WITH GRADIENT STRUCTURE

(71) Applicant: GM GLOBAL TECHNOLOGY OPERATIONS LLC, Detroit, MI (US)

(72) Inventor: Taylor R. Garrick, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 637 days.

(21) Appl. No.: 17/510,582

(22) Filed: Oct. 26, 2021

(65) Prior Publication Data

US 2023/0128117 A1    Apr. 27, 2023

(51) Int. Cl.
*H01M 4/36* (2006.01)
*H01M 4/02* (2006.01)
(Continued)

(52) U.S. Cl.
CPC ............ *H01M 4/364* (2013.01); *H01M 4/133* (2013.01); *H01M 4/134* (2013.01); *H01M 4/386* (2013.01);
(Continued)

(58) Field of Classification Search
CPC ...... H01M 4/364; H01M 4/133; H01M 4/134; H01M 4/386; H01M 4/387; H01M 4/587;
(Continued)

(56) References Cited

U.S. PATENT DOCUMENTS

2003/0082446 A1* 5/2003 Chiang ............... H01M 4/0404
                                                    429/210
2008/0113271 A1* 5/2008 Ueda ..................... H01M 4/38
                                                    429/231.95
(Continued)

FOREIGN PATENT DOCUMENTS

CN      109301160 A  *  2/2019  ........ H01M 10/0525
CN      112201770 A  *  1/2021  .......... H01M 10/052
(Continued)

OTHER PUBLICATIONS

H.Y Sohn, "The effect of particle size distribution on packing density," The Canadian Journal of Chemical Engineering, vol. 46, Issue 3, Wiley Online Library, pp. 162-167 (Jun. 1968).
(Continued)

*Primary Examiner* — Ula C Ruddock
*Assistant Examiner* — Olivia Mason Ruggiero
(74) *Attorney, Agent, or Firm* — Harness, Dickey & Pierce, P.L.C.

(57) ABSTRACT

A negative electrode of a lithium battery includes a current collector and a negative electrode layer disposed on a major surface of the current collector. The negative electrode layer exhibits a gradient structure including a proximal portion adjacent the major surface of the current collector and an opposite distal portion that defines a facing surface of the negative electrode layer. The negative electrode layer is configured such that a power density of the distal portion of the negative electrode layer is greater than that of the proximal portion of the negative electrode layer, and an
(Continued)

energy density of the proximal portion of the negative electrode layer is greater than that of the distal portion of the negative electrode layer.

9 Claims, 3 Drawing Sheets

(51) Int. Cl.

| | | |
|---|---|---|
| *H01M 4/133* | (2010.01) | |
| *H01M 4/134* | (2010.01) | |
| *H01M 4/38* | (2006.01) | |
| *H01M 4/587* | (2010.01) | |
| *H01M 10/0525* | (2010.01) | |

(52) U.S. Cl.
CPC ........... *H01M 4/387* (2013.01); *H01M 4/587* (2013.01); *H01M 10/0525* (2013.01); *H01M 2004/021* (2013.01); *H01M 2004/027* (2013.01)

(58) Field of Classification Search
CPC ....... H01M 10/0525; H01M 2004/021; H01M 2004/027

See application file for complete search history.

(56) References Cited

U.S. PATENT DOCUMENTS

| | | | | |
|---|---|---|---|---|
| 2013/0309414 A1* | 11/2013 | Eskra | ................... | H01M 4/1391 |
| | | | | 427/126.6 |
| 2014/0127561 A1* | 5/2014 | Yamami | ............ | H01M 10/0567 |
| | | | | 429/188 |
| 2015/0303512 A1* | 10/2015 | Kimura | .................. | H01M 4/583 |
| | | | | 429/246 |
| 2016/0351892 A1* | 12/2016 | Sugimori | .............. | H01M 4/483 |
| 2020/0235406 A1* | 7/2020 | Lee | ....................... | H01M 4/1393 |
| 2021/0159507 A1* | 5/2021 | Morin | ................... | H01M 4/667 |
| 2023/0141441 A1* | 5/2023 | Kim | ....................... | H01M 4/485 |
| | | | | 429/231.3 |
| 2024/0204165 A1* | 6/2024 | Li | ...................... | H01M 10/0569 |

FOREIGN PATENT DOCUMENTS

| | | | | |
|---|---|---|---|---|
| CN | 116031361 A | 4/2023 | | |
| DE | 102022122352 A1 | 4/2023 | | |
| JP | H11214035 A | 8/1999 | | |
| JP | 2002151055 A * | 5/2002 | ........ | H01M 10/0525 |
| KR | 20040047780 A | 6/2004 | | |
| KR | 20190042335 A * | 4/2019 | | |
| WO | WO-20180164640 A1 | 9/2018 | | |

OTHER PUBLICATIONS

First Office Action for Chinese Patent Application No. 202211201541.1 issued Sep. 14, 2024, with correspondence from China Patent Agent (H.K.) Ltd summarizing Office Action; 16 pages.

* cited by examiner

NEGATIVE ELECTRODE WITH GRADIENT STRUCTURE

INTRODUCTION

The present disclosure relates to electrodes of secondary lithium batteries and, more particularly, to negative electrode architectures that balance high charge storage capacity with fast charge and discharge capabilities.

Batteries generally consist of one or more electrochemical cells that can convert chemical energy into electrical energy by means of electrochemical reduction-oxidation (redox) reactions. In secondary or rechargeable batteries, these electrochemical reactions are reversible, which allows the batteries to undergo multiple charging and discharge cycles.

Electrochemical cells of secondary lithium batteries include a negative electrode, a positive electrode, and an electrolyte that provides a medium for the conduction of lithium ions between the negative and positive electrodes. A porous polymeric separator is oftentimes sandwiched between the negative and positive electrodes that physically separates and electrically isolates the negative and positive electrodes from each other. The negative and positive electrodes are electrically coupled to each other via an external circuit and are oftentimes disposed on respective negative and positive electrode current collectors. The negative and positive electrodes are formulated such that an electrochemical potential is established therebetween when the electrochemical cell is at least partially charged. During discharge of the electrochemical cell, the electrochemical potential established between the negative and positive electrodes drives spontaneous redox reactions within the electrochemical cell and the release of lithium ions and electrons at the negative electrode. The lithium ions released from the negative electrode diffuse through the electrolyte to the positive electrode, while the electrons simultaneously travel from the negative electrode to the positive electrode via the external circuit, which generates an electric current. After the negative electrode has been partially or fully depleted of lithium, the electrochemical cell may be recharged by connecting the negative and positive electrodes to an external power source, which drives nonspontaneous redox reactions within the electrochemical cell and the release of the lithium ions and the electrons from the positive electrode.

The power density of an electrochemical cell of a lithium battery is related to the rate at which lithium ions and electrons can be passed between and stored within the negative and positive electrodes during charge and discharge of the electrochemical cell. One method of increasing the power density of an electrochemical cell is by reducing the thickness of the negative and/or positive electrodes, as doing so reduces the length of the $Li^+$ diffusion pathway through the electrodes. On the other hand, reducing the thickness of the negative and/or positive electrodes, without changing the composition thereof, reduces the specific capacity and energy density of the electrochemical cell. It may be beneficial to develop electrode structures and formulations that can provide an electrochemical cell with a combination of high power density and high energy density.

SUMMARY

A negative electrode is disclosed that comprises a current collector and a negative electrode layer disposed on a major surface of the current collector. The negative electrode layer includes active material particles and exhibits a gradient structure including a proximal portion adjacent the major surface of the current collector and an opposite distal portion that defines a facing surface of the negative electrode layer. A power density of the distal portion of the negative electrode layer is greater than that of the proximal portion of the negative electrode layer, and an energy density of the proximal portion of the negative electrode layer is greater than that of the distal portion of the negative electrode layer.

The gradient structure of the negative electrode layer may include an intermediate portion that extends continuously between the proximal portion and the distal portion thereof. In such case, a power density of the intermediate portion may be less than that of the distal portion of the negative electrode layer and greater than that of the proximal portion of the negative electrode layer, and an energy density of the intermediate portion may be less than that of the proximal portion of the negative electrode layer and greater than that of the distal portion of the negative electrode layer.

In aspects, the negative electrode layer may exhibit a particle size gradient. In such case, the active material particles in the proximal portion of the negative electrode layer may exhibit a first mean diameter, the active material particles in the distal portion of the negative electrode layer may exhibit a second mean diameter, and the first mean diameter may be greater than the second mean diameter.

In aspects, the gradient structure of the negative electrode layer may include an intermediate portion that extends continuously between the proximal portion and the distal portion thereof. In such case, the active material particles in the intermediate portion of the negative electrode layer may exhibit a third mean diameter, and wherein the third mean diameter may be greater than the second mean diameter and less than the first mean diameter.

In aspects, the active material particles may consist essentially of particles of graphite. In such case, the first mean diameter may be greater than 10 micrometers and the second mean diameter may be less than 10 micrometers.

In aspects, the negative electrode layer may exhibit a porosity gradient. In such case, the proximal portion of the negative electrode layer may exhibit a first porosity, the distal portion of the negative electrode layer may exhibit a second porosity, and the second porosity may be greater than the first porosity.

In aspects, the negative electrode layer may exhibit an electrochemical reaction rate gradient. In such case, the active material particles in the proximal portion of the negative electrode layer may exhibit a first electrochemical reaction rate, the active material particles in the distal portion of the negative electrode layer may exhibit a second electrochemical reaction rate, and the second electrochemical reaction rate may be greater than the first electrochemical reaction rate.

In aspects, the negative electrode layer may exhibit a diffusion coefficient gradient. In such case, the active material particles in the proximal portion of the negative electrode layer may exhibit a first lithium ion ($Li^+$) solid-state diffusion coefficient, the active material particles in the distal portion of the negative electrode layer may exhibit a second $Li^+$ solid-state diffusion coefficient, and the second $Li^+$ solid-state diffusion coefficient may be greater than the first $Li^+$ solid-state diffusion coefficient.

In aspects, the negative electrode layer may exhibit an electrical conductivity gradient. In such case, the negative electrode layer may include electrically conductive carbon particles, the proximal portion of the negative electrode layer may have a first mass fraction of electrically conductive carbon particles, the distal portion of the negative electrode layer may have a second mass fraction of electrically conductive carbon particles, and the second mass fraction may be greater than the first mass fraction.

The active material particles may consist essentially of graphite, silicon, tin, and/or tin oxide.

An electrochemical cell for a lithium battery is disclosed. The electrochemical cell comprises a positive electrode, a negative electrode, and a porous separator. The positive electrode includes a positive electrode layer disposed on a major surface of a positive electrode current collector. The negative electrode includes a negative electrode layer disposed on a major surface of a negative electrode current collector. The negative electrode layer includes negative electrode active material particles. The porous separator is sandwiched between a facing surface of the positive electrode layer and a facing surface of the negative electrode layer. The negative electrode layer exhibits a gradient structure including a proximal portion adjacent the major surface of the negative electrode current collector and an opposite distal portion adjacent the porous separator. A power density of the distal portion of the negative electrode layer is greater than that of the proximal portion of the negative electrode layer. An energy density of the proximal portion of the negative electrode layer is greater than that of the distal portion of the negative electrode layer.

In aspects, the gradient structure of the negative electrode layer may include an intermediate portion that extends continuously between the proximal portion and the distal portion thereof. In such case, a power density of the intermediate portion may be less than that of the distal portion of the negative electrode layer and greater than that of the proximal portion of the negative electrode layer. An energy density of the intermediate portion may be less than that of the proximal portion of the negative electrode layer and greater than that of the distal portion of the negative electrode layer.

In aspects, the negative electrode layer may exhibit a particle size gradient. In such case, the active material particles in the proximal portion of the negative electrode layer may exhibit a first mean diameter, the active material particles in the distal portion of the negative electrode layer may exhibit a second mean diameter, and the first mean diameter may be greater than the second mean diameter.

The gradient structure of the negative electrode layer may include an intermediate portion that extends continuously between the proximal portion and the distal portion thereof. The active material particles in the intermediate portion of the negative electrode layer may exhibit a third mean diameter, and the third mean diameter may be greater than the second mean particle diameter and less than the first mean particle diameter.

In aspects, the negative electrode layer may exhibit a porosity gradient. In such case, the proximal portion of the negative electrode layer may exhibit a first porosity, the distal portion of the negative electrode layer may exhibit a second porosity, and the second porosity may be greater than the first porosity.

The negative electrode active material particles may consist essentially of graphite, silicon, tin, and/or tin oxide.

An electrochemical cell for a lithium battery is disclosed. The electrochemical cell comprises a positive electrode, a negative electrode, and a porous separator. The positive electrode includes a positive electrode layer disposed on a major surface of a positive electrode current collector. The negative electrode includes a negative electrode layer disposed on a major surface of a negative electrode current collector. The negative electrode layer includes negative electrode active material particles. The porous separator is sandwiched between a facing surface of the positive electrode layer and a facing surface of the negative electrode layer. The negative electrode layer exhibits a gradient structure including a proximal portion adjacent the major surface of the negative electrode current collector and an opposite distal portion adjacent the porous separator. The negative electrode layer exhibits a particle size gradient, with the negative electrode active material particles in the proximal portion of the negative electrode layer having a first mean diameter, the negative electrode active material particles in the distal portion of the negative electrode layer having a second mean diameter, and the first mean diameter being greater than the second mean diameter.

The gradient structure of the negative electrode layer may include an intermediate portion that extends continuously between the proximal portion and the distal portion thereof. In such case, the active material particles in the intermediate portion of the negative electrode layer may exhibit a third mean diameter, and the third mean diameter may be greater than the second mean particle diameter and less than the first mean particle diameter.

In aspects, the negative electrode active material particles may consist essentially of particles of graphite. In such case, the negative electrode active material particles in the proximal portion of the negative electrode layer may exhibit a first mean diameter of greater than 10 micrometers and the negative electrode active material particles in the distal portion of the negative electrode layer may exhibit a second mean diameter of less than 10 micrometers.

In aspects, the negative electrode layer may exhibit a porosity gradient. In such case, the proximal portion of the negative electrode layer may exhibit a first porosity, the distal portion of the negative electrode layer may exhibit a second porosity, and the second porosity may be greater than the first porosity.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

Figure 1:
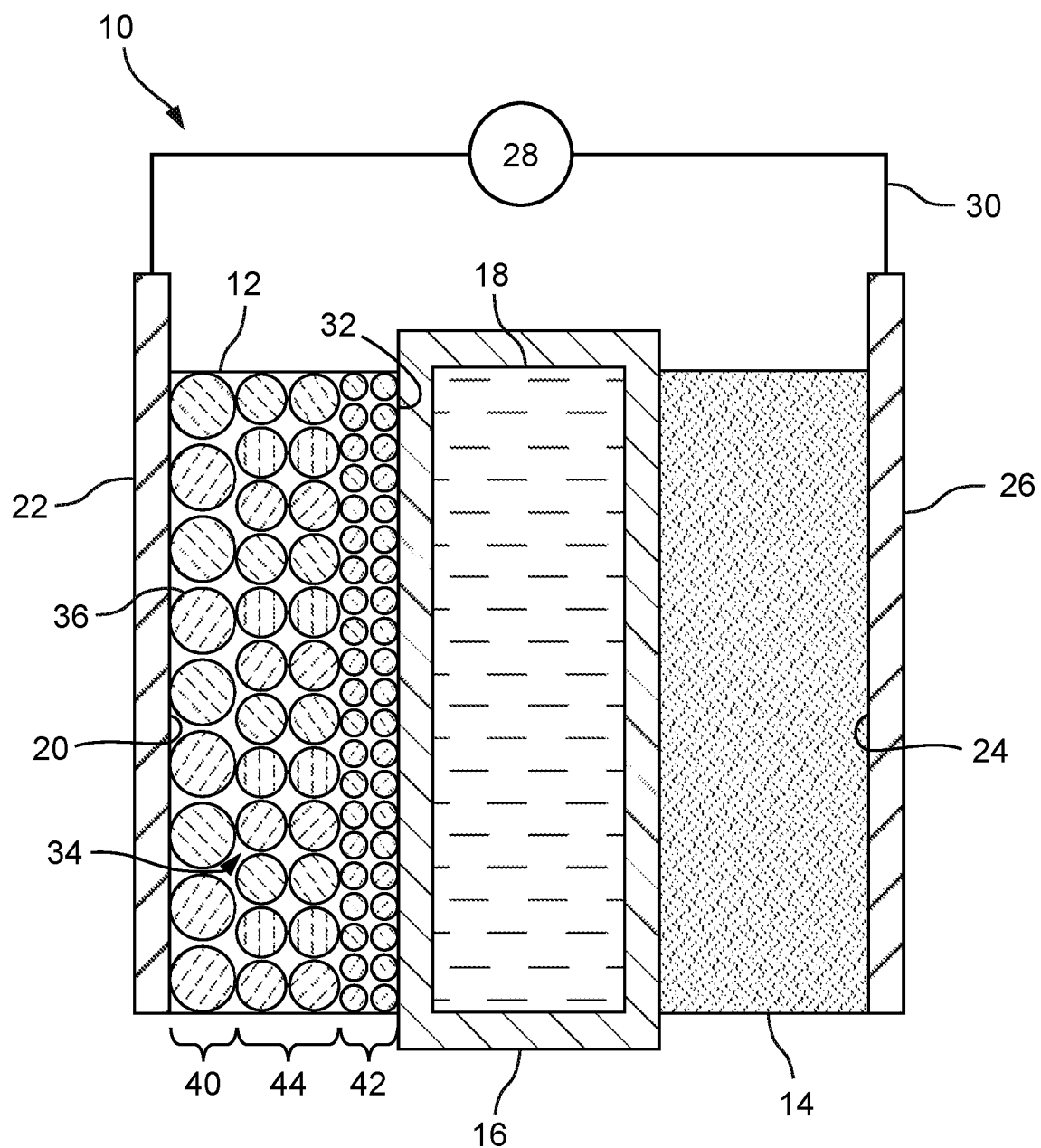
FIG. 1 is a schematic side cross-sectional view of an electrochemical cell of a secondary lithium battery, including a negative electrode and a positive electrode spaced apart from one another by a porous separator, wherein the negative electrode includes a negative electrode layer that exhibits a gradient structure including a proximal portion and an opposite distal portion.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed negative electrode includes a negative electrode active material layer with a gradient structure that provides the negative electrode with improved fast charging capabilities, without substantially reducing the charge storage capacity thereof, as compared to negative electrode active material layers that have a substantially uniform, homogenous structure. The gradient structure of the negative electrode active material layer includes a proximal portion adjacent the negative electrode current collector and an opposite distal portion adjacent the separator. The distal portion of the negative electrode active material layer is formulated to maximize the charging rate capability of the negative electrode, while the proximal portion of the negative electrode active material layer is formulated to provide the negative electrode with a high charge storage capacity.

As used herein, the word "about" means plus or minus 5% of the stated number.

The word "substantially" does not exclude "completely." For example, a composition which is "substantially free" from Y may or may not be completely free from Y.

FIG. 1 depicts a schematic side cross-sectional view of an electrochemical cell 10 that may be combined with one or more additional electrochemical cells to form a secondary lithium battery (not shown), such as a lithium-ion battery or a lithium metal battery. The electrochemical cell 10 includes a negative electrode layer 12, a positive electrode layer 14 spaced apart from the negative electrode layer 12, and a porous separator 16 sandwiched between the negative and positive electrodes 12, 14. The negative and positive electrode layers 12, 14 and the porous separator 16 are infiltrated with an electrolyte 18 that provides a medium for the conduction of lithium ions therethrough. The negative electrode layer 12 is disposed on a major surface 20 of a negative electrode current collector 22, and the positive electrode layer 14 is disposed on a major surface 24 of a positive electrode current collector 26. In practice, the negative and positive electrode current collectors 22, 26 may be electrically coupled to a power source or load 28 via an external circuit 30.

Figure 2:
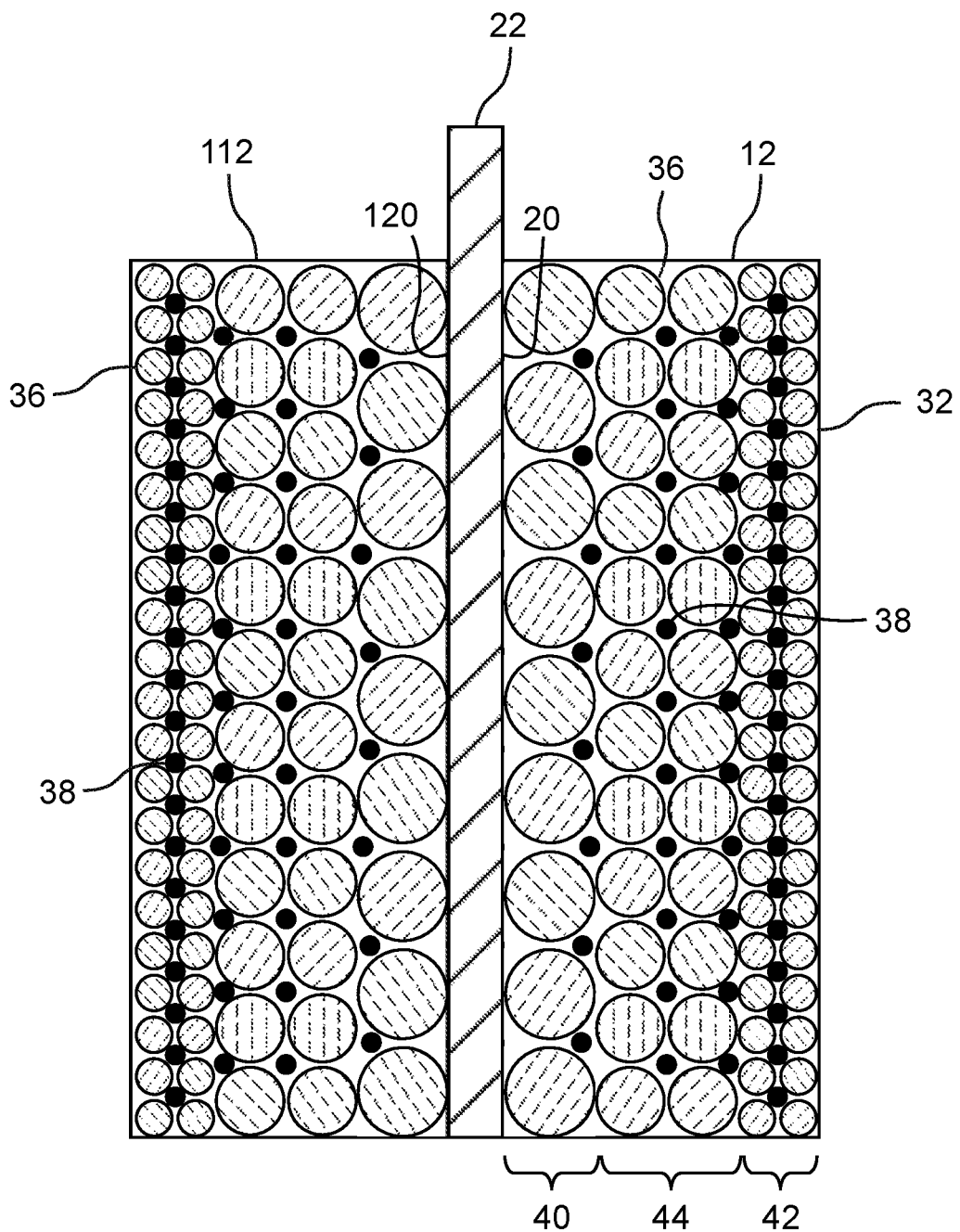
FIG. 2 is a schematic side cross-sectional view of a double-sided negative electrode including a negative electrode current collector having a first negative electrode layer disposed on a first side thereof and a second negative electrode layer disposed on an opposite second side thereof, wherein each of the first and second negative electrode layers exhibits a gradient structure.

As shown in FIG. 2, when the electrochemical cell 10 is combined with one or more additional electrochemical cells to form a secondary lithium battery, the negative electrode current collector 22 may include a first negative electrode layer 12 disposed on a first major surface 20 thereof and a second negative electrode layer 112 disposed on an opposite second major surface 120 thereof. The second negative electrode layer 112 may exhibit substantially the same physical structure and may have substantially the same chemical composition as that of the first negative electrode layer 12. The following description of the negative electrode layer 12 applies equally to the second negative electrode layer 112.

The negative electrode layer 12 is a porous composite material with a gradient structure that is configured to provide the negative electrode layer 12 with a relatively fast charging rate and a high charge storage capacity. As shown in FIG. 1, the negative electrode layer 12 may be disposed on the major surface 20 of the negative electrode current collector 22 in the form of a substantially continuous uniform layer of material. The negative electrode layer 12 may have a thickness, measured from the major surface 20 of the negative electrode current collector 22 to a facing surface 32 thereof, in a range of from 5 micrometers to 600 micrometers. In assembly, open pores 34 defined within the porous structure of the negative electrode layer 12 are infiltrated with the electrolyte 18. The composite material of the negative electrode layer 12 includes a mixture of negative electrode active material particles 36, electrically conductive additive particles 38 (FIG. 2), and optionally a binder (not shown).

The negative electrode active material particles 36 are made of a negative electrode active material that is formulated to store and release lithium ions by undergoing a reversible redox reaction with lithium during discharge and recharge of the electrochemical cell 10. In aspects, the negative electrode active material may comprise a lithium intercalation host material that is formulated to undergo the reversible insertion or intercalation of lithium ions. Examples of lithium intercalation host materials for the negative electrode active material may comprise or consist essentially of carbon-based materials, e.g., graphite, activated carbon, carbon black, and/or graphene. In aspects, the negative electrode active material may comprise or consist essentially of a material that can accommodate lithium atoms/ions by electrochemically alloying and/or forming compound phases with lithium, e.g., silicon (Si), germanium (Ge), tin (Sn), lead (Pb), antimony (Sb), bismuth (Bi), zinc (Zn), aluminum (Al), cadmium (Cd), alloys or intermetallic compounds of Si, Ge, Sn, Pb, Sb, Bi, Zn, Al, and/or Cd (optionally with other metal or non-metal elements, and/or oxides, carbides, nitrides, sulfides, phosphides, selenides, and/or tellurides of Si, Ge, Sn, Pb, Sb, Bi, Zn, Al, Fe, and/or Cd.

The negative electrode active material particles 36 may account for, by weight, from 70% to 98.9% of the negative electrode layer 12, from 90% to 98% of the negative electrode layer 12, or from 95% to 98% of the negative electrode layer 12. In aspects, the negative electrode active material particles 36 may account for, by weight, about 97% of the negative electrode layer 12.

The electrically conductive additive particles 38 are formulated to optimize the electrical percolation and conductivity of the negative electrode layer 12, for example, by forming a robust electrically conductive network within the negative electrode layer 12, which may, in turn, increase the charge and discharge rate capability of the negative electrode layer 12. The electrically conductive additive particles 38 may comprise particles of graphite, carbon black, acetylene black, ketjen black, metal (e.g., copper, nickel, aluminum, silver, and/or alloys thereof), and/or electrically conductive polymers (e.g., polyphenylene derivatives). In aspects, the electrically conductive additive particles 38 may exhibit a fibrous structure, e.g., carbon fibers. The electrically conductive additive particles 38 may account for, by weight, greater than 0.5%, greater than 1.0%, or greater than 1.5%, less than 10%, less than 5%, or less than 2.5%, or from 0.5% to 10%, from 1.0% to 5%, or from 1.5% to 2.5% of the negative electrode layer 12.

The binder is formulated to provide the negative electrode layer 12 with structural integrity, for example, by creating cohesion between the negative electrode active material particles 36 and the electrically conductive additive particles 38 in the negative electrode layer 12, and by adhering the negative electrode layer 12 to the major surface 20 of the negative electrode current collector 22. The binder may be made of a polymeric material. Examples of polymeric materials include polyvinylidene fluoride (PVdF), polyvinylidene fluoride copolymers, ethylene propylene diene monomer (EPDM) rubber, styrene butadiene rubber (SBR), carboxymethyl cellulose (CMC), polyacrylic acid, and combinations thereof. In aspects, the binder may consist essentially of polyvinylidene fluoride. The binder may account for, by weight, from 0.5% to 10% of the negative electrode layer 12, from 0.5% to 5% of the negative electrode layer 12, or from 0.5% to 2.5% of the negative electrode layer 12.

The gradient structure of the negative electrode layer 12 is defined across a thickness direction of the negative electrode layer 12 and includes a proximal portion 40 adjacent the major surface 20 of the negative electrode current collector 22, an opposite distal portion 42 that defines the facing surface 32 of the negative electrode layer 12, and optionally one or more intermediate portions 44 that extend substantially continuously between the proximal and distal portions thereof. The distal portion 42 of the negative electrode layer 12 is formulated to maximize the charging rate capability (high power density) of the negative electrode layer 12, and the proximal portion 40 of the negative electrode layer 12 is formulated to provide the negative electrode layer 12 with a high charge storage capacity (high energy density). To accomplish this, the physical structure and/or the chemical composition of the distal portion 42 of the negative electrode layer 12 is different than that of the proximal portion 40 of the negative electrode layer 12. Specifically, the distal portion 42 and the proximal portion 40 of the negative electrode layer 12 may differ with respect to at least one of the following attributes: particle size, porosity, lithium ion ($Li^+$) diffusion coefficient, electrochemical reaction rate, and mass fraction of the electrically conductive additive particles 38.

In aspects, the negative electrode layer 12 may exhibit a particle size gradient. In such case, a mean particle diameter of the negative electrode active material particles 36 (and optionally the electrically conductive additive particles 38) in the proximal portion 40 of the negative electrode layer 12 may be greater than that in the distal portion 42 of the negative electrode layer 12. In addition, in aspects where the gradient structure of the negative electrode layer 12 includes one or more intermediate portions 44, the mean particle diameter of the negative electrode active material particles 36 in the one or more intermediate portions 44 may be greater than the mean particle diameter of the negative electrode active material particles 36 in the distal portion 42 of the negative electrode layer 12 and less than the mean particle diameter of the negative electrode active material particles 36 in the proximal portion 40 of the negative electrode layer 12.

In practice, the mean particle diameter of the negative electrode active material particles 36 in the distal portion 42, the one or more intermediate portions 44, and the proximal portion 40 of the negative electrode layer 12 may depend upon the composition of the negative electrode active material particles 36. For example, in aspects where the negative electrode active material particles 36 comprise particles of graphite, the negative electrode active material particles 36 in the proximal portion 40 of the negative electrode layer 12 may exhibit a mean particle diameter of greater than 10 micrometers, and the negative electrode active material particles 36 in the distal portion 42 of the negative electrode layer 12 may exhibit a mean particle diameter of less than 10 micrometers.

Without intending to be bound by theory, it is believed that the relatively small mean particle diameter of the negative electrode active material particles 36 in the distal portion 42 of the negative electrode layer 12 may reduce the tortuosity of the liquid phase $Li^+$ transport path and the effective diffusion length of the liquid phase $Li^+$ transport path through the distal portion 42 of the negative electrode layer 12, as compared to that of the proximal portion 40 of the negative electrode layer 12. This may increase the rate at which $Li^+$ ions can diffuse into or out of the distal portion 42 of the negative electrode layer 12, which may increase the rate at which $Li^+$ ions can be stored in and released from the negative electrode layer 12. In addition, the relatively small mean particle diameter of the negative electrode active material particles 36 in the distal portion 42 of the negative electrode layer 12 may provide the negative electrode active material particles 36 in the distal portion 42 with a relatively high specific surface area (as compared to that of the negative electrode active material particles 36 in the proximal portion 40), which may increase the charge transfer rate at the interface between the negative electrode active material particles 36 and the electrolyte 18 in the distal portion 42 and thus may increase the electrochemical reaction rate of the negative electrode active material particles 36 in the distal portion 42 of the negative electrode layer 12. Furthermore, under fast charging conditions, the relatively small negative electrode active material particles 36 in the distal portion 42 may exhibit more robust structural stability than the relatively large negative electrode active material particles 36 in the proximal portion 40, which may help extend the life of the electrochemical cell 10. At the same time, the relatively large mean particle diameter of the negative electrode active material particles 36 in the proximal portion 40 of the negative electrode layer 12 may provide the negative electrode layer 12 with a relatively high charge storage capacity.

At high charge and discharge rates, the electrochemical cell 10 may be subjected to a high current density. In such case, the inherent internal impedance of the electrochemical cell 10 may cause the overall potential of the electrochemical cell 10 to increase to accommodate the high current flow, with the positive electrode layer 14 being pushed to a higher potential and the negative electrode layer 12 dropping to a lower potential. In situations where the electrochemical potential of the negative electrode layer 12 drops below 0 V vs $Li/Li^+$, lithium ions in the electrolyte 18 may be reduced to lithium metal and deposited on the facing surface 32 of the negative electrode layer 12, instead of being stored within the negative electrode active material particles 36 of the negative electrode layer 12. Lithium metal deposited or "plated" on the facing surface 32 of the negative electrode layer 12 may no longer be available to participate in the electrochemical redox reactions occurring within the electrochemical cell 10, which may decrease the charge storage capacity of the entire electrochemical cell 10. In addition, at high charge and discharge rates, a $Li^+$ concentration gradient may develop within the negative and positive electrode layers 12, 14 of the electrochemical cell 10. For example, at high discharge rates, the $Li^+$ concentration in the positive electrode layer 14 may be substantially depleted in a portion of the positive electrode layer 14 closest to the positive electrode current collector 26. At the same time, at high charge rates, the Li$^+$ concentration in the proximal portion 40 of the negative electrode layer 12 may be substantially depleted, while the Li$^+$ concentration in the distal portion 42 may be relatively high. The electrochemically active material particles in the portions of the negative and positive electrode layers 12, 14 that are substantially depleted of Li$^+$ ions may experience low or near zero electrochemical reaction rates, which may reduce the rate at which Li$^+$ ions can be stored in and released from the electrochemical cell 10 (i.e., the power density of the electrochemical cell 10). The high rate capability of the distal portion 42 of the negative electrode layer 12 takes advantage of the relatively high Li$^+$ concentration that may occur in the distal portion 42 under fast charging conditions, as well as the corresponding faster electrochemical reaction rates.

In aspects, the negative electrode layer 12 may exhibit a porosity gradient. In such case, the porosity of the proximal portion 40 of the negative electrode layer 12 may be less than that in the distal portion 42 of the negative electrode layer 12. For example, the proximal portion 40 of the negative electrode layer 12 may exhibit a porosity in a range of from 20% to less than 30% and the distal portion 42 of the negative electrode layer 12 may exhibit a porosity in a range of from greater than 30% to 50%. In aspects where the gradient structure of the negative electrode layer 12 includes one or more intermediate portions 44, the porosity of the one or more intermediate portions 44 may be greater than that in the proximal portion 40 and less than that in the distal portion 42 of the negative electrode layer 12. For example, in aspects where the gradient structure of the negative electrode layer 12 includes one or more intermediate portions 44, the porosity of the proximal portion 40 may be in a range of from 20% to less than 25%, the porosity of the one or more intermediate portions 44 may be in a range of from greater than 25% to less than 30%, and the porosity of the distal portion 42 may be in a range of from greater than 30% to 40%.

Without intending to be bound by theory, it is believed that the relatively high porosity of the distal portion 42 of the negative electrode layer 12 may increase the rate at which Li$^+$ ions can diffuse into or out of the distal portion 42 of the negative electrode layer 12, which may increase the rate at which Li$^+$ ions can be stored in and released from the negative electrode layer 12. However, increasing the porosity of the distal portion 42 of the negative electrode layer 12 may reduce the charge storage capacity thereof. This decrease in storage capacity may be compensated for by the relatively low porosity of the proximal portion 40 of the negative electrode layer 12. In aspects where the negative electrode layer 12 exhibits a porosity gradient, the mass fraction of negative electrode active material particles 36 in the proximal portion 40 of the negative electrode layer 12 may be greater than the mass fraction of negative electrode active material particles 36 in the distal portion 42 of the negative electrode layer 12.

In aspects, the negative electrode layer 12 may exhibit an electrochemical reaction rate gradient. In such case, the electrochemical reaction rate of the distal portion 42 of the negative electrode layer 12 may be greater than that of the proximal portion 40 of the negative electrode layer 12. In aspects, the proximal, distal, and intermediate portions 40, 42, 44 of the negative electrode layer 12 may be configured to exhibit different electrochemical reaction rates, for example, by controlling and/or adjusting the mean particle diameters of the negative electrode active material particles 36 therein. Additionally or alternatively, the proximal, distal, and intermediate portions 40, 42, 44 of the negative electrode layer 12 may be configured to exhibit different electrochemical reaction rates, for example, by controlling and/or adjusting the chemical composition of the negative electrode active material particles 36 therein.

In aspects, the negative electrode layer 12 may exhibit a diffusion coefficient gradient. In such case, the diffusion coefficient of the distal portion 42 of the negative electrode layer 12 may be greater than that of the proximal portion 40 of the negative electrode layer 12. The proximal, distal, and intermediate portions 40, 42, 44 of the negative electrode layer 12 may be configured to exhibit different diffusion coefficients, for example, by controlling and/or adjusting the chemical composition of the negative electrode active material particles 36 therein.

In aspects, the negative electrode layer 12 may exhibit an electrical conductivity gradient, which may be established by establishing a gradient in the amount of electrically conductive additive particles 38 in the negative electrode layer 12. For example, the mass fraction of the electrically conductive additive particles 38 in the distal portion 42 of the negative electrode layer 12 may be selected to provide the distal portion 42 with relatively high electrical conductivity (as compared to the proximal portion 40), which may help promote relatively fast charge and discharge rates. At the same time, the mass fraction of the electrically conductive additive particles 38 in the proximal portion 40 of the negative electrode layer 12 may be selected to provide the proximal portion 40 with relatively high charge capacity (as compared to the distal portion 42. Specifically, the mass fraction of the electrically conductive additive particles 38 in the distal portion 42 of the negative electrode layer 12 may be greater than that in the proximal portion 40. In aspects, the mass fraction of the electrically conductive additive particles 38 in the distal portion 42 of the negative electrode layer 12 may be in a range of from 5.0% to 10.0%, and the mass fraction of the electrically conductive additive particles 38 in the proximal portion 40 of the negative electrode layer 12 may be in a range of from 1.5% to 2.5%.

The positive electrode layer 14 is a porous composite material and may include a substantially homogenous mixture of positive electrode active material particles, electrically conductive additive particles, and optionally a binder. The positive electrode active material particles may be made of a material that is formulated to undergo a reversible redox reaction with lithium at a higher electrochemical potential than the negative electrode active material particles 36 of the negative electrode layer 12 such that an electrochemical potential difference exists between the negative electrode layer 12 and the positive electrode layer 14. The positive electrode active material particles may be made of a material that can undergo lithium intercalation and deintercalation, alloying and dealloying, or plating and stripping. In aspects, the positive electrode active material particles may comprise an intercalation host material that can undergo the reversible insertion or intercalation of lithium ions. In such case, the intercalation host material may comprise a layered oxide represented by the formula LiMeO$_2$, an olivine-type oxide represented by the formula LiMePO$_4$, a spinel-type oxide represented by the formula LiMe$_2$O$_4$, a favorite represented by one or both of the following formulas LiMeSO$_4$F or LiMePO$_4$F, or a combination thereof, where Me is a transition metal (e.g., Co, Ni, Mn, Fe, Al, V, or a combination thereof). For example, the positive electrode active material particles may comprise lithium nickel manganese cobalt oxide (LiNiMnCoO$_2$), lithium cobalt oxide (LiCoO$_2$), lithium manganese oxide (LiMn$_2$O$_4$), lithium nickel cobalt manganese aluminum oxide (LiNiCoMnAlO$_2$), lithium iron phosphate (LiFePO$_4$), and/or lithium manganese iron phosphate (LiMn$_x$Fe$_{1-x}$PO$_4$). In aspects, the positive electrode active material particles may comprise a conversion material that can undergo a reversible electrochemical reaction with lithium, wherein the conversion material undergoes a phase change or a change in crystalline structure accompanied by a change in oxidation state. Example conversion materials include sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. When the conversion material is a metal compound of one or more of the above elements, the metal may be iron, manganese, nickel, copper, and/or cobalt.

The porous separator 16 is configured to physically separate and electrically isolate the negative electrode layer 12 and the positive electrode layer 14 from one another while permitting lithium ions to pass therethrough. The porous separator 16 exhibits an open microporous structure and may comprise an organic and/or inorganic material that can physically separate and electrically insulate the negative and positive electrode layers 12, 14 from each other while permitting the free flow of ions therebetween. The porous separator 16 may comprise a non-woven material, e.g., a manufactured sheet, web, or mat of directionally or randomly oriented fibers. The porous separator 16 may comprise a microporous polymeric material, e.g., a microporous polyolefin-based membrane or film. For example, the porous separator 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In aspects, the porous separator 16 may comprise a laminate of one or more polymeric materials, such as a laminate of PE and PP.

The electrolyte 18 is ionically conductive and provides a medium for the conduction/diffusion of lithium ions through the porous separator 16 and through the negative and positive electrodes 12, 14. The negative and positive electrode layers 12, 14 are porous and, in assembly, the electrolyte infiltrates the pores thereof. As such, the electrolyte 18 provides a Li+ ion diffusion pathway through the negative and positive electrode layers 12, 14 and between the negative electrode active material particles 36 of the negative electrode layer 12 and the positive electrode active material of the positive electrode layer 14. The electrolyte 18 may be in the form of a liquid, solid, or gel that infiltrates the pores of the negative and positive electrode layers 12, 14 and the porous separator 16. For example, the electrolyte 18 may comprise a nonaqueous liquid electrolyte solution including one or more lithium salts dissolved in a nonaqueous aprotic organic solvent or a mixture of nonaqueous aprotic organic solvents. Examples of lithium salts include lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluorooxalatoborate (LiBF$_2$(C$_2$O$_4$)), lithium hexafluoroarsenate (LiAsF$_6$), lithium trifluoromethanesulfonate (LiCF$_3$SO$_3$), lithium bis(trifluoromethane) sulfonylimide (LiN(CF$_3$SO$_2$)$_2$), lithium bis(fluorosulfonyl) imide (LiN(FSO$_2$)$_2$) (LiSFI), and combinations thereof. Examples of nonaqueous aprotic organic solvents include alkyl carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane, sulfur compounds (e.g., sulfolane), and combinations thereof. In embodiments where the electrolyte 18 is in the form of a solid, the electrolyte 18 may function as both an electrolyte and a separator and may eliminate the need for a discrete separator 16.

The negative and positive electrode current collectors 22, 26 may be in the form of thin and flexible porous or non-porous electrically conductive substrates and may comprise a metallic material that is capable of collecting and reversibly passing free electrons to and from their respective negative and positive electrodes 12, 14. The term "metallic," as used herein, refers to a material that predominantly comprises one or more metals. As such, a metallic material may comprise a single metal, more than one metal (in alloy form or otherwise), or both one or more metals and one or more other non-metal components in elemental or compound form. For example, the negative and positive electrode current collectors 22, 26 may comprise an electrically conductive metal or metal alloy, e.g., a transition metal or an alloy thereof. In aspects, the negative electrode current collector 22 may comprise aluminum (Al), nickel (Ni), or an iron (Fe) alloy (e.g., stainless steel), and the positive electrode current collector 26 may comprise copper (Cu), nickel (Ni), an iron (Fe) alloy (e.g., stainless steel), or titanium (Ti). Other electrically conductive metallic materials may of course be used, if desired.

Figure 3:
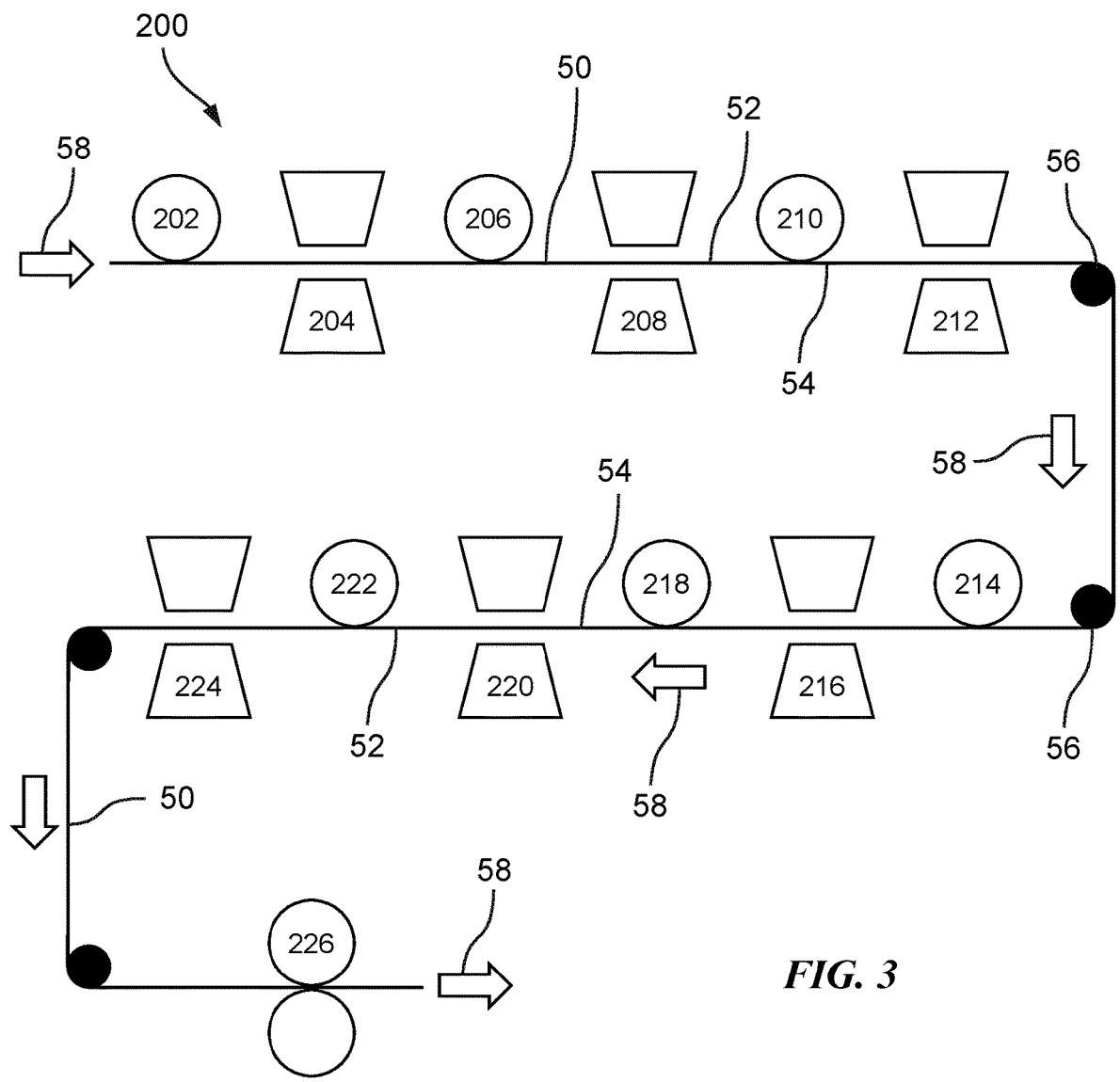
FIG. 3 is a schematic side cross-sectional view of an apparatus for forming a negative electrode layer having a gradient structure on a surface of a metal foil using a continuous process.

Referring now to FIGS. 2 and 3, the first negative electrode layer 12 may be formed on the first major surface 20 of the negative electrode current collector 22 and the second negative electrode layer 112 may be formed on the opposite second major surface 120 of the negative electrode current collector 22 via a continuous process 200. In practice, the porous composite material of the first and second negative electrode layers 12, 112 may be deposited on opposite first and second surfaces 52, 54 of a nonporous metal substrate 50 (e.g., a metal foil), which may then be cut or otherwise formed into the desired size and shape of the negative electrode current collector 22. In the continuous process 200, the metal substrate 50 may be supported and transported on a plurality of rollers 56 through a series of stages in the direction of the arrows 58. Prior to initiating the continuous process 200, two or more negative electrode precursor compositions may be prepared. In the process 200 depicted in FIG. 3, first, second, and third negative electrode precursor compositions are prepared in advance. The first and third negative electrode precursor compositions are formulated to respectively form the proximal portion 40 and the distal portion 42 of the negative electrode layers 12, 112, and the second negative electrode precursor composition is formulated to form the intermediate portion 44 of the negative electrode layers 12, 112. Each of the first, second, and third negative electrode precursor compositions may be in the form of a suspension (slurry) including the negative electrode active material particles 36, the electrically conductive additive particles 38, the optional binder, and a solvent. The solvent may be included in the precursor compositions in a sufficient amount to provide the precursor compositions with desirable thixotropic properties (e.g., desirable viscosities). In aspects, the first, second, and third negative electrode precursor compositions may have a solids content of, by weight, greater than 55%.

In a first stage 202 of the process, the metal substrate 50 may be oriented such that the first surface 52 thereof faces up (opposite the direction of the force of gravity) and the first negative electrode precursor composition may be deposited on the first surface 52 of the metal substrate 50, for example, using a roll coater, to form a first precursor layer (not shown) on the first surface 52 of the metal substrate 50. In a second stage 204 of the process, the metal substrate 50 may be passed under a first heater to dry the first precursor layer (e.g., remove the solvent) and form the proximal portion 40 of the negative electrode layer 12 on the first surface 52 of the metal substrate 50. In a third stage 206 of the process, the second negative electrode precursor composition may be deposited on the first surface 52 of the metal substrate 50, for example, using a roll coater, to form a second precursor layer (not shown) on the first surface 52 of the metal substrate 50 over the proximal portion 40 of the negative electrode layer 12. In a fourth stage 208 of the process, the metal substrate 50 may be passed under a second heater to dry the second precursor layer (e.g., remove the solvent) and form the intermediate portion 44 of the negative electrode layer 12 on the first surface 52 of the metal substrate 50 over the proximal portion 40 of the negative electrode layer 12. In a fifth stage 210 of the process, the third negative electrode precursor composition may be deposited on the first surface 52 of the metal substrate 50, for example, using a roll coater, to form a third precursor layer (not shown) on the first surface 52 of the metal substrate 50 over the intermediate portion 44 of the negative electrode layer 12. In a sixth stage 212 of the process, the metal substrate 50 may be passed under a third heater to dry the third precursor layer (e.g., remove the solvent) and form the distal portion 42 of the negative electrode layer 12 on the first surface 52 of the metal substrate 50 over the intermediate portion 44 of the negative electrode layer 12.

After completion of the sixth stage 212 of the process, the metal substrate 50 may be transported and reoriented by the rollers 56 so that the metal substrate 50 is oriented with the second surface 54 thereof facing up (opposite the direction of the force of gravity). In a seventh stage 214 of the process, the first negative electrode precursor composition may be deposited on the second surface 54 of the metal substrate 50, for example, using a roll coater, to form a first precursor layer (not shown) on the second surface 54 of the metal substrate 50. In an eighth stage 216 of the process, the metal substrate 50 may be passed under a fourth heater to dry the first precursor layer (e.g., remove the solvent) and form the proximal portion 40 of the negative electrode layer 112 on the second surface 54 of the metal substrate 50. In a ninth stage 218 of the process, the second negative electrode precursor composition may be deposited on the second surface 54 of the metal substrate 50, for example, using a roll coater, to form a second precursor layer (not shown) on the second surface 54 of the metal substrate 50 over the proximal portion 40 of the negative electrode layer 112. In a tenth stage 220 of the process, the metal substrate 50 may be passed under a fifth heater to dry the second precursor layer (e.g., remove the solvent) and form the intermediate portion 44 of the negative electrode layer 112 on the second surface 54 of the metal substrate 50 over the proximal portion 40 of the negative electrode layer 112. In an eleventh stage 222 of the process, the third negative electrode precursor composition may be deposited on the second surface 54 of the metal substrate 50, for example, using a roll coater, to form a third precursor layer (not shown) on the second surface 54 of the metal substrate 50 over the intermediate portion 44 of the negative electrode layer 112. In a twelfth stage 224 of the process, the metal substrate 50 may be passed under a sixth heater to dry the third precursor layer (e.g., remove the solvent) and form the distal portion 42 of the negative electrode layer 112 on the second surface 54 of the metal substrate 50 over the intermediate portion 44 of the negative electrode layer 112.

In a thirteenth stage 226 of the process, the metal substrate 50 may be transported by the rollers 56 through a calendering apparatus, which may include passing the metal substrate 50 between a pair of calender rollers that are separated by a predetermined gap. The calendering apparatus may reduce the thickness and the porosity of the negative electrode layers 12, 112.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrochemical cell for a lithium battery, the electrochemical cell comprising:
    a positive electrode including a positive electrode layer disposed on a major surface of a positive electrode current collector;
    a negative electrode including a negative electrode layer disposed on a major surface of a negative electrode current collector, the negative electrode layer including negative electrode active material particles; and
    a porous separator sandwiched between a facing surface of the positive electrode layer and a facing surface of the negative electrode layer,
    wherein the negative electrode layer exhibits a gradient structure including a proximal portion adjacent the major surface of the negative electrode current collector and an opposite distal portion adjacent the porous separator,
    wherein a power density of the distal portion of the negative electrode layer is greater than that of the proximal portion of the negative electrode layer,
    wherein an energy density of the proximal portion of the negative electrode layer is greater than that of the distal portion of the negative electrode layer,
    wherein the negative electrode layer exhibits a porosity gradient, wherein the proximal portion of the negative electrode layer exhibits a first porosity, the distal portion of the negative electrode layer exhibits a second porosity, and the second porosity is greater than the first porosity,
    wherein the negative electrode layer exhibits a particle size gradient, wherein the negative electrode active material particles in the proximal portion of the negative electrode layer have a first mean diameter, the negative electrode active material particles in the distal portion of the negative electrode layer have a second mean diameter, and the first mean diameter is greater than the second mean diameter, wherein the first mean diameter is greater than 10 micrometers, and the second mean diameter is less than 10 micrometers, wherein the mass fraction of the negative electrode active material particles in the proximal portion of the negative electrode layer is greater than the mass fraction of the negative electrode active material particles in the distal portion of the negative electrode layer, and wherein the negative electrode active material particles consist of a material selected from graphite, silicon, tin, and tin oxide.

2. The electrochemical cell of claim 1 wherein the gradient structure of the negative electrode layer includes an intermediate portion that extends continuously between the proximal portion and the distal portion thereof, wherein a power density of the intermediate portion is less than that of the distal portion of the negative electrode layer and greater than that of the proximal portion of the negative electrode layer, and wherein an energy density of the intermediate portion is less than that of the proximal portion of the negative electrode layer and is greater than that of the distal portion of the negative electrode layer.

3. The electrochemical cell of claim 1 wherein the gradient structure of the negative electrode layer includes an intermediate portion that extends continuously between the proximal portion and the distal portion thereof, wherein the negative electrode active material particles in the intermediate portion of the negative electrode layer exhibit a third mean diameter, and wherein the third mean diameter is greater than the second mean particle diameter and less than the first mean particle diameter.

4. An electrochemical cell for a lithium battery, the electrochemical cell comprising:
a positive electrode including a positive electrode layer disposed on a major surface of a positive electrode current collector;
a negative electrode including a negative electrode layer disposed on a major surface of a negative electrode current collector, the negative electrode layer including negative electrode active material particles; and
a porous separator sandwiched between a facing surface of the positive electrode layer and a facing surface of the negative electrode layer,
wherein the negative electrode layer exhibits a gradient structure including a proximal portion adjacent the major surface of the negative electrode current collector and an opposite distal portion adjacent the porous separator,
wherein the negative electrode layer exhibits a particle size gradient, the negative electrode active material particles in the proximal portion of the negative electrode layer exhibit a first mean diameter, the negative electrode active material particles in the distal portion of the negative electrode layer exhibit a second mean diameter, and the first mean diameter is greater than the second mean diameter,
wherein the negative electrode layer exhibits an electrochemical reaction rate gradient, wherein the negative electrode active material particles in the proximal portion of the negative electrode layer have a first electrochemical reaction rate, the negative electrode active material particles in the distal portion of the negative electrode layer have a second electrochemical reaction rate, and the second electrochemical reaction rate is greater than the first electrochemical reaction rate,
wherein the negative electrode layer has a diffusion coefficient gradient, the negative electrode active material particles in the proximal portion of the negative electrode layer have a first lithium ion (li+) solid-state diffusion coefficient, the negative electrode active material particles in the distal portion of the negative electrode layer have a second Li+ solid-state diffusion coefficient, and the second Li+ solid-state diffusion coefficient is greater than the first Li+ solid-state diffusion coefficient, and
wherein the negative electrode active material particles consist of a material selected from graphite, silicon, tin, and tin oxide.

5. The electrochemical cell of claim 4 wherein the gradient structure of the negative electrode layer includes an intermediate portion that extends continuously between the proximal portion and the distal portion thereof, the negative electrode active material particles in the intermediate portion of the negative electrode layer exhibit a third mean diameter, the third mean diameter is greater than the second mean particle diameter and less than the first mean particle diameter, the negative electrode active material particles in the intermediate portion of the negative electrode layer have a third electrochemical reaction rate, the third electrochemical reaction rate is greater than the first electrochemical reaction rate and less than the second electrochemical reaction rate, the negative electrode active material particles in the intermediate portion of the negative electrode layer have a third lithium ion ($Li^+$) solid-state diffusion coefficient, the third $Li^+$ solid-state diffusion coefficient is greater than the first Lit solid-state diffusion coefficient and less than the second $Li^+$ solid-state diffusion coefficient.

6. The electrochemical cell of claim 4 wherein the negative electrode active material particles in the proximal portion of the negative electrode layer exhibit a first mean diameter of greater than 10 micrometers and the negative electrode active material particles in the distal portion of the negative electrode layer exhibit a second mean diameter of less than 10 micrometers.

7. The electrochemical cell of claim 4 wherein the negative electrode layer exhibits a porosity gradient, wherein the proximal portion of the negative electrode layer exhibits a first porosity, the distal portion of the negative electrode layer exhibits a second porosity, and the second porosity is greater than the first porosity.

8. The negative electrode of claim 4 wherein the mass fraction of the negative electrode active material particles in the proximal portion of the negative electrode layer is greater than the mass fraction of the negative electrode active material particles in the distal portion of the negative electrode layer.

9. The negative electrode of claim 1 wherein the negative electrode active material particles comprise graphite particles, the graphite particles in the proximal portion of the negative electrode layer have a mean particle diameter of greater than 10 micrometers, and the graphite particles in the distal portion of the negative electrode layer have a mean particle diameter of less than 10 micrometers.

* * * * *